INVENTOR.
JAMES S. ROBBINS, DECEASED
BY WILLIAM W. MILLER, EXECUTOR
BY
Murray A. Gleeson
ATTORNEY Oct. 30, 1962  J. S. ROBBINS  3,061,289
ROTARY HEAD TUNNELING MACHINE
Original Filed April 25, 1955  4 Sheets-Sheet 3

Fig. 3

INVENTOR.
JAMES S. ROBBINS, DECEASED
BY WILLIAM W. MILLER, EXECUTOR
BY
Murray A. Gleeson
ATTORNEY

INVENTOR.
JAMES S. ROBBINS, DECEASED
BY WILLIAM W. MILLER, EXECUTOR
BY
ATTORNEY

United States Patent Office 3,061,289
Patented Oct. 30, 1962

3,061,289
ROTARY HEAD TUNNELING MACHINE
James S. Robbins, deceased, late of Seattle, Wash., by William W. Miller, executor, Northfield, Ill., assignor to Goodman Manufacturing Company, a corporation of Illinois
Continuation of application Ser. No. 570,147, Mar. 7, 1956, which is a division of application Ser. No. 503,702, Apr. 25, 1955, now Patent No. 2,766,978, dated Oct. 16, 1956. This application Nov. 13, 1959, Ser. No. 852,907
13 Claims. (Cl. 262—7)

This invention relates to improvements in tunneling machines of the rotary cutter head type, and has for its principal object to provide a more efficient machine of this character.

More particularly, the invention relates to tunneling machines adapted for cutting large bores, wherein certain special problems of structural design are encountered because of the magnitude of the machine.

This application is a continuation of application Serial No. 540,147, filed March 7, 1956, and entitled "Rotary Head for Tunneling Machine," now abandoned, which application is a division of application Serial No. 503,702 filed April 25, 1955, and now Patent No. 2,766,978.

The invention may best be understood by reference to the accompanying drawings, in which:

FIGURE 3 is an enlarged fragmentary detail sectional view taken generally on line 3—3 of FIGURE 1;

Figure 1:
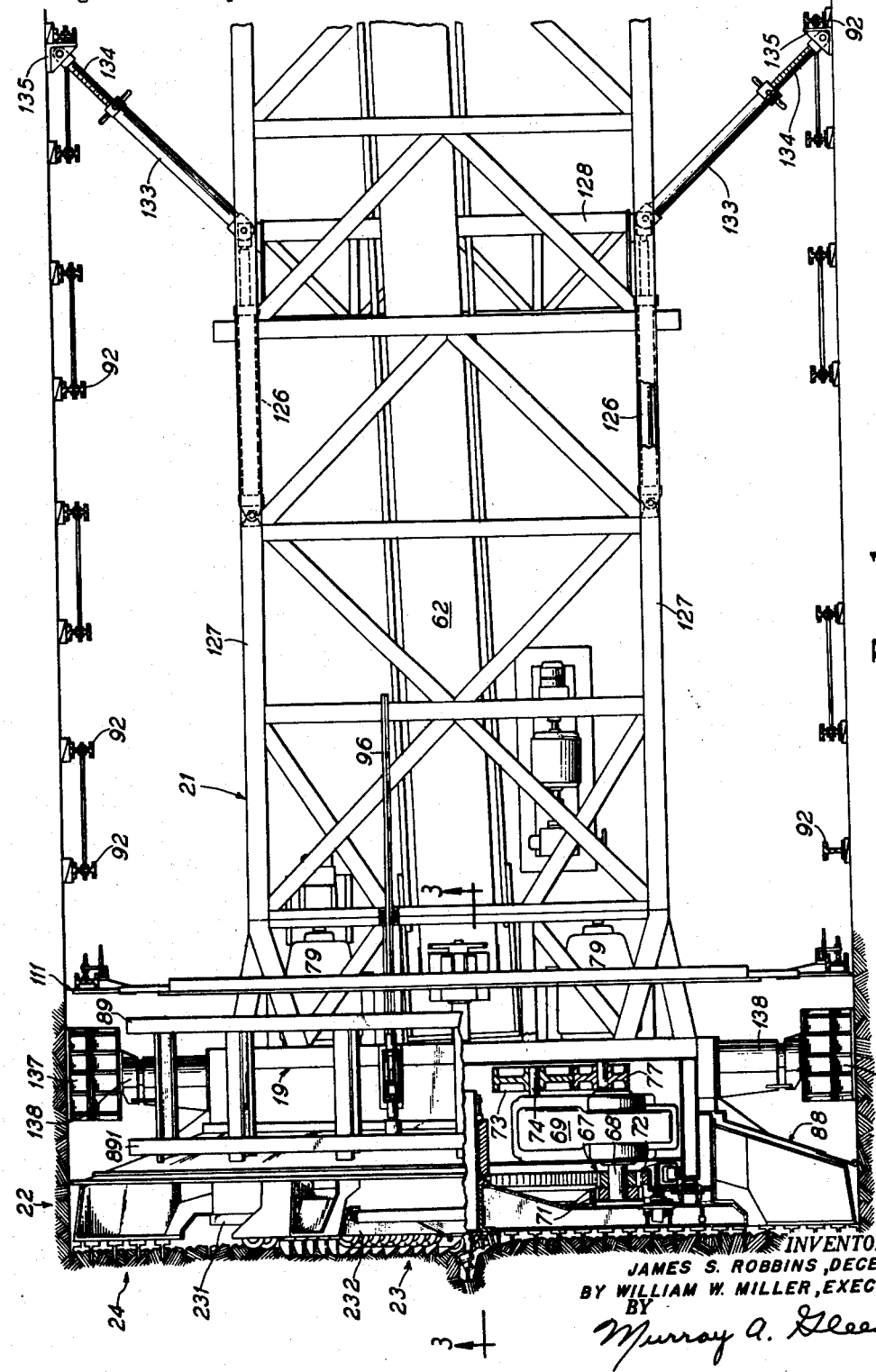
FIGURE 1 is a fragmentary plan view showing the front end of a tunneling machine constructed in accordance with the invention, with certain parts broken away and certain other parts shown in section.

Referring now to details of the embodiment of the invention shown in the drawings, the machine has as its principal elements a main frame or jumbo 21 having a cutting head at its forward end, indicated generally at 22. For the present description, that part of the machine behind the juncture line 19 (FIGURE 1) is the jumbo 21; ahead of it is the cutter head 22 and the structural work supporting it on the jumbo. The cutter head itself consists of a circular inner cutter member 23 surrounded by an outer cutter member 24, which cutter members are arranged for rotation in opposite directions to neutralize the torque reaction on the jumbo.

As shown in FIGURE 3, the inner cutter member 23 consists essentially of a double-walled disc 231, including front and back circular walls 231a and 231b. Inset in the front face, and protruding forwardly therefrom, are three radially extending cutter arms 232 each carrying a radial alignment of kerf-cutting bits or tools 234 and core-breaking rollers 236 which form the subject matter of my copending application Serial No. 473,847, filed December 8, 1954, and now Patent No. 2,766,977. At the center of the inner head 23 is a pilot burster cone 233 and other radially disposed core breaking rollers 235 which form the subject matter of my copending application Serial No. 475,791, filed December 16, 1954, and now Patent No. 2,766,976. Details of construction of said kerf-cutting bits, core-breaking rollers and pilot cone need not be further shown nor described herein.

Each inner cutter arm 232 comprises a front wall 26 and a rear wall 27 connected at their outer edges by an angular cap piece 28 and at their center by a hollow sleeve 29. Each arm 232 has an outer section 30 which is removable to reduce the overall diameter when required for backing out of a tunnel in which steel ribbing and concrete lining has been set. The sleeve 29 has flanges 31 and 32, welded to the front and rear walls 26 and 27, respectively. The sleeve 29 is mounted on a hollow shaft 33 projecting rearwardly therefrom and having a collar 34 welded thereon. Cap screws 36 extend through drilled holes in the collar 34 into tapped holes in the flange 32 to secure shaft 33 to the inner head portion 23.

The rear portion of shaft 33 is rotatably journaled in a pair of bushings 38, 38 in a journal bearing 37. Said bearing is supported on the framing mounted on the front of the jumbo, as by a plurality of radially extending struts 381 which are welded to a ring-like section 51 which will be described subsequently. A thrust bearing 41 takes thrust against the journal bearing 38 from the collar 34. The rear end of shaft 33 may be suitably secured against endwise movement relative to the bearing 37, as by a washer 42, spacer 43 and a lock nut 44 threaded on said shaft.

The outer cutter member 24 consists essentially of a bearing and drive ring 45 disposed rearwardly adjacent the outer rim of the disc 231 of the inner cutter member 23, and having a plurality of radially extending cutter arms 451, herein six in number, projecting therefrom in forwardly offset relation immediately beyond the ends of the cutter arms 232, so that their front faces 452 are substantially in the same vertical plane as the front faces of said cutter arms 232 on the inner cutter member 23 (see FIGURES 1 and 3). These cutter arms 451 have a plurality of kerf cutting bits 454 and core-breaking rollers 456 on their front faces, similar to the bits 234 and rollers 236 on the cutter arms 232, as previously mentioned, except that the bits and rollers are disposed for cutting in the opposite direction, as the cutter head member 24 is rotated in the direction opposite to the inner head member 23, as will presently be described.

As shown in FIGURE 3, the thrust on the outer cutter member 24 is transmitted to the jumbo 21 by a plurality of tapered rollers 48 in brackets 49 spaced circumferentially about the drive ring 45 and having rolling engagement with a ring-like section 51 forming part of the cutter head framing mounted on the jumbo 21. A plurality of rollers 52 on brackets 53 are mounted on a rearwardly projecting flange portion 456 of drive ring 45, in rolling engagement with the inner face of the supporting frame ring 51. The inner cutter member 23 has a plurality of tapered rollers 46 on brackets 47 mounted in spaced relation about the rear face of said inner cutter head in rolling engagement with the front face of the drive ring 45 of the outer cutter member 24.

Each of the cutter arms 451 carries a material-gathering bucket 54 on its rear face. The leading sides of the buckets 54 are open to enable them to scoop up the loose material which drops to the floor of the tunnel as it is removed from the working face. As each bucket is rotated to a position at the top of the cutter head, the loose material therein falls by gravity through a bucket outlet opening 57, thence through a registering opening 58 in the frame ring 51, and down a chute 59 supported below said frame ring into a hopper 61, which may for convenience be of the vibrating type. The hopper deposits the loose material upon a belt conveyor 62 extending longitudinally of the jumbo, for deposit upon a suitable connecting system of extensible conveyors (not shown) which may be supported in part on the jumbo or in part from the roof of the tunnel for final discharge in any suitable manner. The material may thus be continuously removed from the tunnel as rapidly as it is dislodged from the working face.

Figure 2:
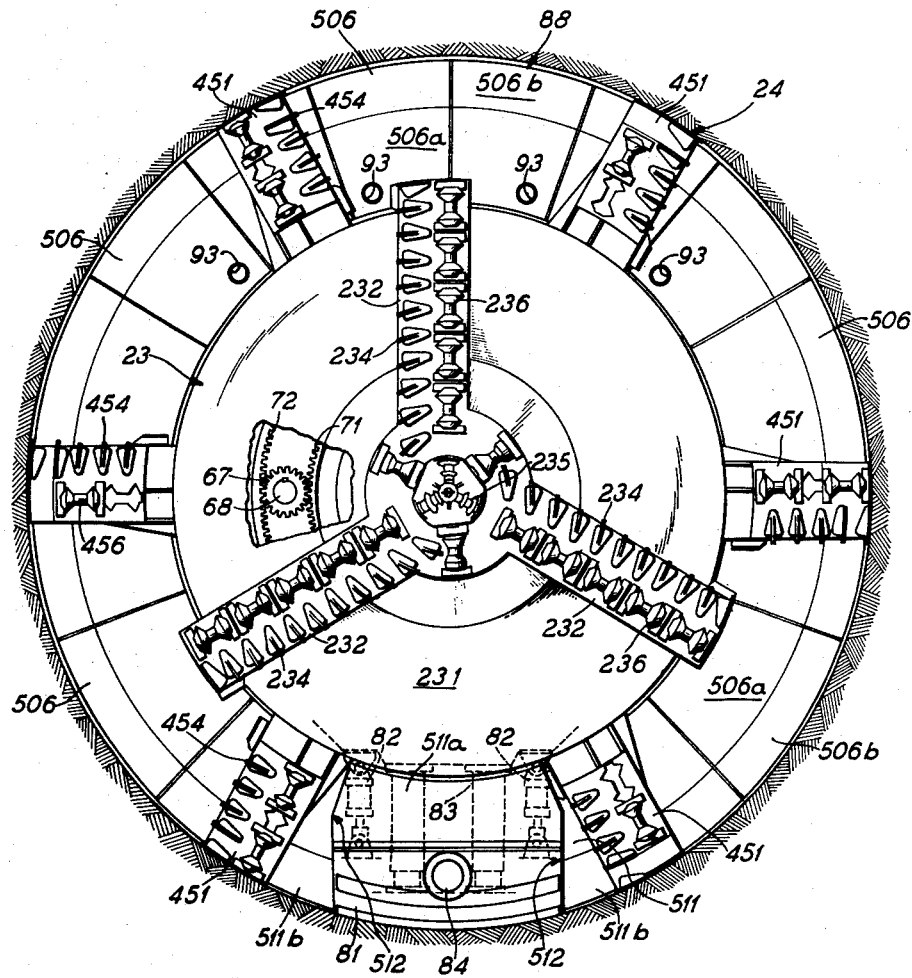
FIGURE 2 is a front face view of the machine, as it would appear in a tunnel.

As shown in FIGURES 2 and 3, the inner cutter member 23 has an external ring gear 71 fixed concentrically on its rear wall 231b and 27, and the outer cutter member 24 has an internal ring gear 72 of larger diameter fixed on the inner periphery of its drive ring 45. The external gear 71 and the internal gear 72 are closely spaced axially of one another so that the rear face of the former is substantially coplanar with the front face of the latter. Gears 71 and 72 are driven in opposite directions by a pair of diametrically opposed double pinions 67, 67, each having a first gear 671 in driving engagement with the external gear 71 and a coaxial second gear 672 in driving engagement with the internal gear 72. The axial displacement of gears 71 and 72 and the arrangement of driving said gears with the double pinions 67, 67 permits the speed ratio between the inner and outer head members 23 and 24 to be varied merely by changing the diameters of the gears 671 and 672 and correspondingly changing the diameters of the gears 71 and 72. Thus, the speed ratio may be changed to suit variations in the material being mined or in the size of the tunnel being bored. This arrangement also permits the large expensive gears 71 and 72 to be manufactured and stocked in a size which may be used interchangeably on a wide range of cutter head diameters. With the gearing arrangement and pinion sizes shown in the drawings, the inner cutter member 23 is driven at a higher speed than the outer cutter member 24. The double pinions 67, 67 are keyed to shafts 68, 68 of gear reduction mechanisms 69, 69. Each gear reducing mechanism 69, 69 is driven by a V-belt pulley 73 keyed on a shaft 74 and connected by a V-belt 76 to a pulley 77 on a shaft 78 of a drive motor 79 mounted on the framing between the head and the jumbo.

Figure 4:
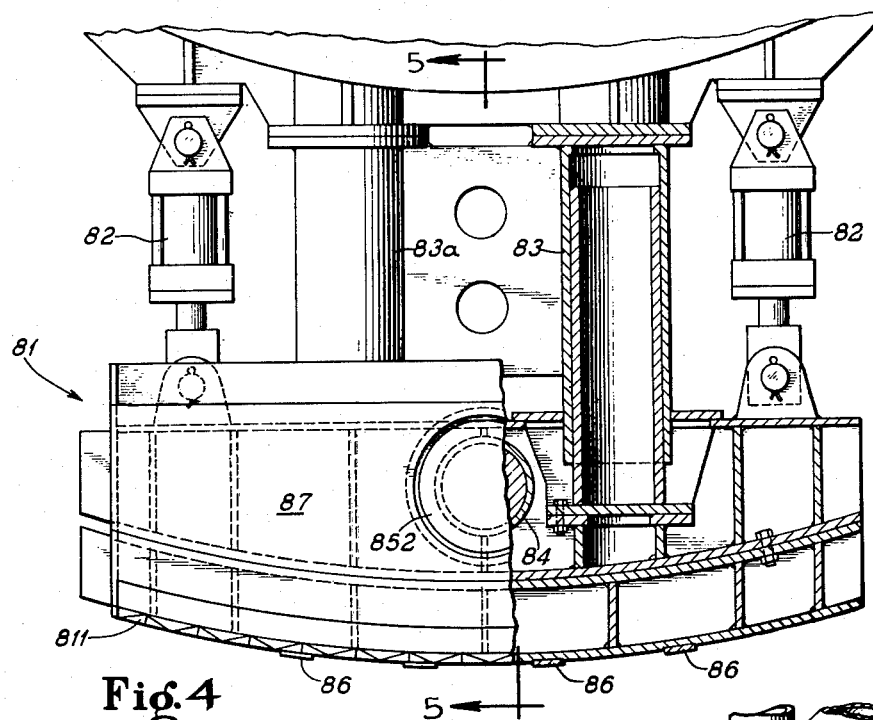
FIGURE 4 is a detail front view, in part in elevation and in part in section, of the supporting shoe for the cutter head and jumbo.
Figure 5:
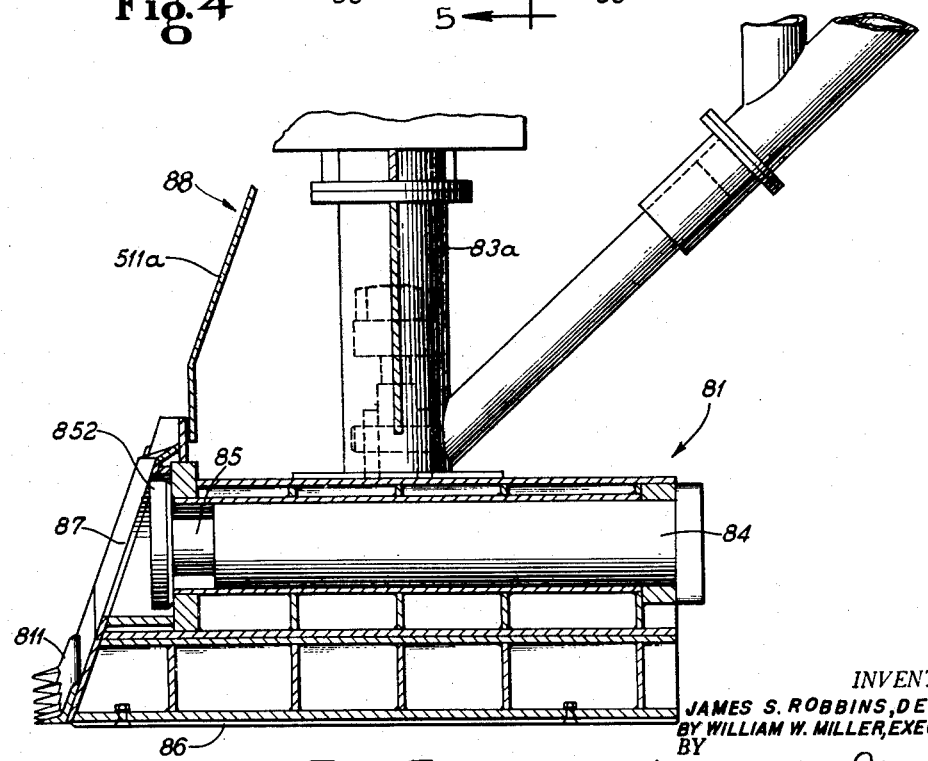
FIGURE 5 is a section taken on line 5—5 of FIGURE 4.

The cutter head and jumbo are supported on the tunnel floor by a sliding shoe 81 shown in FIGURES 4 and 5, on which the height of the cutter head and the front end of the jumbo are vertically adjustable by a pair of hydraulic cylinders 82, 82 at opposite sides of the shoe. Longitudinal thrust on the shoe is transmitted through a pair of vertical telescopic guides 83, 83a.

A third hydraulic cylinder 84 is disposed horizontally within and longitudinally of the shoe 81, with a piston rod 85 having a head 852 at its front end adapted to thrust against the tunnel face for pushing the entire machine back when necessary, as, for instance, for workmen to change cutting tools or core breakers.

The bottom of shoe 81 is arcuate in transverse section to accommodate it to the shape of the tunnel, and is provided with a plurality of longitudinally disposed steel strips or runners 86 projecting slightly below the arcuate bottom surface, which are of sufficient area to support the front end of the machine when cutting in solid rock. When tunneling through soft formations the runners 86 will sink down allowing the whole bottom area of the shoe to support the front end of the machine.

The shoe 81 is formed with an upwardly and rearwardly inclined front face 87 of such shape as to coincide with the forwardly and outwardly inclined rear faces of the buckets 54 on the rotating outer portion 24 of the cutting head. The shoe thus aids in crowding the loose material which is dislodged onto the floor from the working face into the path of the rotating buckets to be picked up by the latter. A series of forwardly projecting teeth 811 may be mounted along the extreme lower rim of the shoe, beyond the outer corners of the buckets 54, to aid in moving the shoe along the floor, and in elevating the loose material into position to be picked up by said buckets.

An arcuate shield, generally designated 88 is carried by the frame just behind the cutting head and functions to crowd dislodged material forward into the path of the pick-up buckets 54 carried by the outer cutter member 24. The shield is fabricated of a number of sheet metal segments 506 fastened (see FIGURE 3) to the main frame as by bolts 507 and in some cases by additional bolts 508. Each segment 506 includes an inner section 506a and an outer section 506b, the latter being removable, in this particular case, for using the machine in a smaller diameter tunnel. At the bottom, the shield has a plate 511 which is generally in the shape of an inverted U, including an inner section 511a and outer, removable sections 511b. The plate 511 thus is shaped to define a downwardly open, marginal recess 512 for the independently adjustable support shoe 81. As shown in FIG. 5, the shield 88 is circumferentially aligned with the front face 87 of the shoe and forms, in effect, a continuation of that front face so as to effectively crowd the dislodged material forward into the path of the pick-up buckets.

The shield flares forwardly and outwardly to conform substantially with the back shapes of the rotating buckets 54, and the outer rim of said shield is of almost the same diameter as the maximum cutting diameter of said outer cutter head portion 24, so as to have only a working clearance relative to the tunnel walls.

As shown in FIGURE 3, a frame 89 for shielding the head from the roof is preferably covered at its top by a number of steel plates 91 (or lengths of railroad rail), spanning arcuate frame members 891 and 892 (connected to the supporting ring 51 by means not shown) so as to protect the machine and the workmen below from roof falls. As the tunnel progresses, the plates 91 may be pushed back into supporting engagement with the ring beams 92 which line and support the tunnel, and new plates 91 are placed on top of the frame 89.

The shield 88 is provided with a plurality (in this case, four) of openings 93 for face jacks 94, herein located in transversely spaced relation near the upper part of said shield (see FIGURES 2 and 3). Rams 96 of face jacks 94 are adapted to be projected through these openings 93 to support the working face when the machine is backed off for changing bits or breaker rollers. The face jacks may be advanced or retracted by any conventional mechanism, details of which need not be shown herein.

As shown in FIGURE 1, a ring beam assembly jig generally indicated at 111 is mounted on the jumbo 21 to the rear of the arcuate shielding frame 89 for the purpose of mechanically assembling and positioning a series of ring beams 92 into supporting engagement with the tunnel walls as rapidly as the tunnel is advanced by the cutting head. Said ring beam assembly jig forms the subject matter of a copending patent application to Robert G. Budd, bearing Serial No. 493,797, filed March 11, 1955, and now Patent No. 2,764,876, so further details thereof need not be described herein.

The mechanism for advancing the machine is shown in FIGURE 1, as consisting of two hydraulic jacks 126, 126 which are pivotally connected at their cylinder ends to the opposite sides of the longitudinal jumbo side frame members 127, 127. Said cylinders extend along and beneath said jumbo frame members, and their rods are connected to a sub frame 128 extending transversely between and having its opposite ends guided for slidable movement along said jumbo frame members.

Pivoted to the opposite ends of the sub frame 128 are rearwardly and outwardly extending pusher legs 133, 133 each having screw jacks 134, 134 threaded in their outer ends and carrying pivoted shoes 135, 135 at the extreme ends thereof to fit and push against a ring beam 92 fixed in the wall of the tunnel, as shown in FIGURE 1. Generally, it will be desirable to back up the ring beams by suitable blocking to carry the backward thrust. The axis of the machine may be tilted to change the direction of travel of the machine from a straight line direction by lengthening or shortening one or the other pusher legs 133, 133 bearing against a ring beam 92.

Limited lateral shifting movement of the cutter head, while the latter is in operation is afforded by a pair of laterally extending shoes 137, 137 on the outer ends of hydraulic jacks 138, 138 at opposite sides of the intermediate framing closely adjacent the cutter head, as seen in FIGURE 1.

During operation of the machine, the shoes 137, 137 as shown in FIGURE 1, are normally in position to engage the bore wall. Said shoes serve to free the cutter head where it may become hung up, by shifting the cutter head laterally, and cooperate with the shoe 81 to maintain the boring head in the proper position during the boring operation.

In thrusting the head forward into the face, the supporting shoe 81 will be pushed along the floor of the tunnel and, in order to relieve the cylinders 82, 82 of transverse thrust loads, the vertical telescopic guides 83, 83a will be made strong enough to withstand them. Thus, when the machine is moved forward into the face the vertical guides 83, 83a will transmit thrust from the intermediate frame mounted on the jumbo into the shoe; conversely, when the machine is backed away from the face by the reversing cylinder 84, thrust is exerted on the frame from the shoe through the guides 83, 83a.

Although certain embodiments of the invention have been shown and described, it will be understood that the invention is not to be limited to the exact construction shown and described, but that various changes and modifications may be made without departing from the spirit and scope of the invention as defined by the appended claims.

The invention claimed is:

1. In a tunneling machine, a frame having a rotary cutter head for cutting a bore in advance of the machine, a conveyor carried by said frame, a shield carried by said frame immediately behind said rotary cutter head and conforming to the shape of at least the lower portion of said bore for crowding dislodged material forward, bucket means carried by said cutter head effective to pick up material ahead of said shield and deposit it onto said conveyor, said shield having a marginal opening at its lower edge, a supporting shoe for said frame disposed in the marginal opening in said shield and being vertically movable relative thereto, said shoe having its bottom face arcuately shaped to conform substantially with the bottom of the bore cut by said cutter head and adapted to slide along the tunnel bottom to crowd dislodged material into the path of said bucket means, and means affording vertical adjustment of said head relative to said shoe comprising a pair of vertically disposed guide members on said frame telescopically cooperating with guide members on said shoe, and a pair of power-operated hydraulic jacks interposed between said frame and said shoe, said guide members and jacks being disposed symmetrically on opposite sides of a vertical plane containing the longitudinal centerline of the cutter head.

2. The structure of claim 1, wherein the guide members on said frame and shoe consist of interfitting telescopic tubular members, and the longitudinal axes of the jacks are disposed along substantially the same transverse plane as the axes of said tubular guide members.

3. In a tunneling machine, a frame having a rotary cutter head for cutting a bore in advance of the machine, a conveyor carried by said frame, bucket pick-up means movable by said cutter head in a circular path adjacent the periphery of the tunnel bore and disposed to deposit material onto said conveyor; a supporting shoe for said frame adjacent said cutter head, said shoe having its bottom face arcuately shaped to conform substantially with the bottom of the bore cut by said cutter head and adapted to slide along the tunnel bottom and to crowd dislodged material forward into the path of said bucket pick-up means, and means affording vertical adjustment of said head relative to said shoe comprising interengaging guide members on said frame and shoe adapted to guide said frame vertically relative to the shoe and transmit longitudinal thrust between the frame and the shoe, power means interposed between said frame and shoe to effect the aforesaid vertical adjustment, a tunnel face engaging pad carried by said shoe, and power means for moving said pad to engage the face for thrusting the cutter head backward from the face.

4. In a tunneling machine, a frame having a rotary cutter head for cutting a bore in advance of the machine, means for feeding said machine forward comprising propulsion means acting between the frame and the rib of the tunnel, a supporting shoe for the front of said frame disposed immediately behind said cutter head, said shoe having its bottom face arcuately shaped to conform with the bottom of the bore cut by said cutter head and adapted to slide along the tunnel bottom, and means affording vertical adjustment of said head relative to said shoe comprising interengaging guide members on said frame and shoe adapted to guide said frame vertically relative to the shoe and to transmit longitudinal thrust between the frame and the shoe, cylinder means interposed between said frame and shoe to effect the aforesaid vertical adjustment, and reversing means carried by the shoe including longitudinally extending cylinder means having a tunnel-face-engaging pad on the forward end thereof for backing the machine away from the face.

5. In a tunneling machine, a frame having a rotary cutter head for cutting a bore in advance of the machine, means for feeding said machine forward comprising propulsion means acting between the frame and the rib of the tunnel, a supporting shoe for the said frame adjacent said cutter head, said shoe having its bottom face arcuately shaped to conform substantially with the bottom of the bore cut by said cutter head, and a forwardly extensible power-operated ram member telescopically mounted on said shoe, adapted for extension beyond the path of movement of said cutter head for bodily retracting said cutter head and frame from engagement with the working face.

6. In a tunneling machine, a frame having a cutter head with radial cutter arms rotatable on a horizontal axis for cutting a bore in advance of the machine, a shield mounted on said frame immediately to the rear of said cutter arms having its edges shaped to conform substantially with the bore cut by said cutter head, said shield having a marginal opening at its lower edge, a supporting shoe for said frame disposed in the marginal opening in said shield having its bottom face shaped to conform substantially with the bottom of the bore cut by said cutter head, and its front face normally in circumferential alignment with the shield, to form a continuation of the latter, and means affording vertical adjustment of said shoe relative to said frame independently of said shield.

7. In a tunneling machine, a frame having a rotary cutter head for cutting a bore in advance of the machine, pickup means carried by said head for removing material dislodged from the working face, a tunnel-conforming shield supported on the frame behind the head and effective to crowd material into the path of the pickup means, said shield having at least one aperture therein, and jack means supported by said frame in alignment with said aperture and extensible through said aperture to temporarily supportably engage a tunnel wall beyond the shield at times.

8. In a tunneling machine, a frame having a rotary cutter head having cutters projecting in advance thereof for cutting a bore in advance of the machine, a plurality of buckets carried by said cutter head rearwardly of said cutters for removing material dislodged from the working face, each of said buckets having an inclined rear face inclined forwardly and outwardly from the inner ends of said buckets to aid in picking up the loose material from the ground and in the discharge of the picked up material at the upper end of the travel of said buckets, an arcuate tunnel-conforming shield supported on said frame behind said buckets and conforming to the plane of inclination of the rear faces of said buckets, said shield having an open lower end portion opening toward the ground, a supporting shoe for carrying the weight of said frame adjacent said cutter head and advancing therewith upon the advance of said cutter head, said shoe having a bottom ground engaging face shaped to substantially conform with the bottom of the bore cut by said cutter head and having a vertically extending forward face extending within the open portion of said shield and inclined upwardly and rearwardly with respect to the advance lower edge of said shoe and said shield and forming a continuation of said shield and cooperating with said shield to crowd the loose material dislodged on to the floor into said buckets, and means for extending said shoe in advance of said shield for engagement with the working face to retract said cutter head and frame.

9. In a tunneling machine, a frame having a rotary cutter head having cutters projecting in advance thereof for cutting a bore in advance of the machine, a plurality of buckets carried by said cutter head rearwardly of said cutters for removing material dislodged from the working face, each of said buckets having an inclined rear face inclined forwardly and outwardly from the inner end of said bucket to aid in picking up the loose material from the ground and in the discharge of the picked up material at the upper end of the travel of the associated bucket, an arcuate tunnel-conforming shield supported on said frame behind said buckets and conforming to the plane of inclination of the rear faces of said buckets for substantially the entire path of rotation thereof, said shield having an open lower end portion opening toward the ground, a supporting shoe for carrying the weight of said frame adjacent said cutter head and advancing therewith upon the advance of said cutter head, said shoe having a bottom ground engaging face shaped to substantially conform with the bottom of the bore cut by said cutter head and having a vertically extending forward face extending within the open portion of said shield and inclined upwardly and rearwardly with respect to the advance lower edge of said shoe and forming a continuation of said shield and cooperating with said shield to crowd the loose material dislodged onto the floor by said cutter head into the path of said buckets, to be picked up thereby.

10. A mining machine comprising a rotatable boring cutter, a non-rotative frame supporting said cutter for rotation, means for rotating said cutter, means supported upon said frame closely behind said cutter and projectable outwardly into contact with the bore wall to guide said boring cutter along the bore wall as it rotates during the boring operation, means separate from said means for guiding said boring cutter to advance the machine axially, said means to advance the machine axially including leg members adjustable in length to vary the line of advance of the machine.

11. A mining machine comprising two coaxial rotatable boring cutters, of greater and lesser diameters, respectively, a non-rotative frame supporting both thereof for rotation, means for rotating said cutters in opposite rotative senses, means supported upon the frame closely behind the greater cutter, and projectable outwardly into contact with the bore wall to guide said boring cutters as they rotate during the boring operation, means separate from said means for guiding said boring cutters to advance the machine axially, and independently adjustable means forming a part of said means to advance the machine axially, to vary the angular relation of the machine with respect to the bore wall and to thereby vary the line of advance of the machine along the bore wall.

12. A mining machine in accordance with claim 11 where the means for guiding the machine during the boring operation includes fluid pressure operated elements mounted for projection outwardly into contact with the bore wall by the admission of fluid under pressure to said fluid pressure operated elements.

13. A mining machine comprising a rotatable boring cutter, a non-rotative frame supporting said boring cutter for rotation, means for rotating said boring cutter, shoes supported on opposite sides of said frame and projectable outwardly into contact with the bore wall to guide said boring cutter along the bore wall as it rotates during the boring operation, extensible power means extending along opposite sides of said frame for advancing the machine axially and including shoes engageable with the bore wall and jack means connected between said extensible power means and said shoes.

References Cited in the file of this patent

UNITED STATES PATENTS

| | | |
|---|---|---|
| 2,170,660 | Langmyhr | Aug. 22, 1939 |
| 2,756,037 | Kirkpatrick | July 24, 1956 |
| 2,864,600 | Kirkpatrick | Dec. 16, 1958 |

FOREIGN PATENTS

| | | |
|---|---|---|
| 167,512 | Australia | Apr. 20, 1956 |